Figure 1:
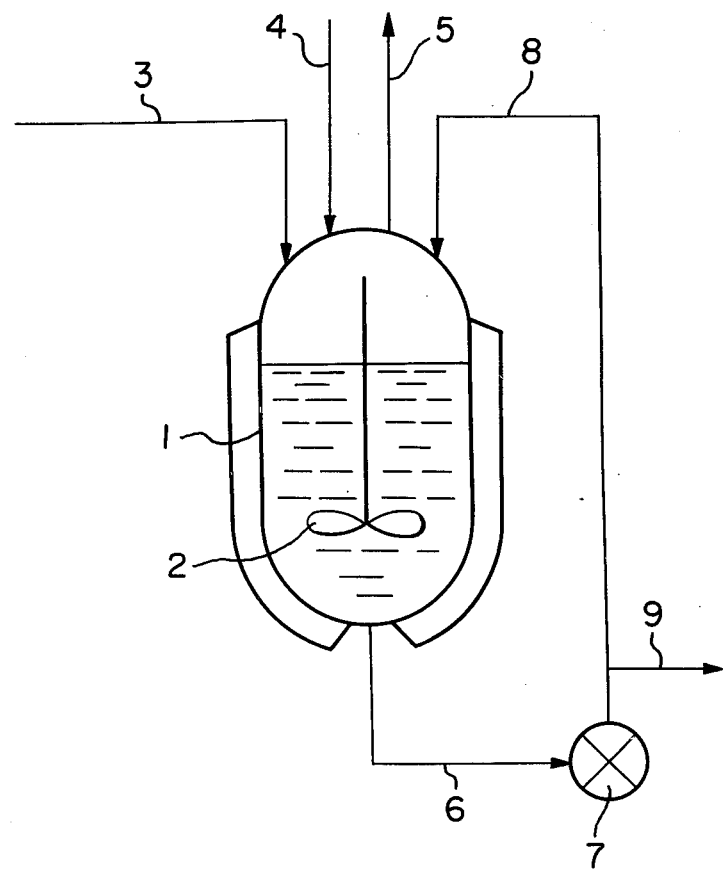

United States Patent [19]

Kohyama et al.

[11] 4,452,976

[45] Jun. 5, 1984

[54] PROCESS FOR PRODUCING AROMATIC POLYESTER POLYCARBONATE PARTICLES

[75] Inventors: Katsuhisa Kohyama; Akira Matsuno, both of Kita-Kyushu; Teruo Kidera, Fukuoka; Kenji Tsuruhara, Kita-Kyushu, all of Japan

[73] Assignee: Mitsubishi Chemical Industries Ltd., Tokyo, Japan

[21] Appl. No.: 496,510

[22] Filed: May 20, 1983

[30] Foreign Application Priority Data

May 27, 1982 [JP] Japan ................................. 57-90247

[51] Int. Cl.$^3$ ............................................ C08G 63/64
[52] U.S. Cl. ..................................... 528/491; 526/65; 526/67; 526/68; 526/70; 528/173; 528/176; 528/191; 528/193; 528/194; 528/500; 528/501; 528/502; 528/503; 528/499
[58] Field of Search ............................... 528/499–503, 528/173, 176, 191, 193, 194; 526/65, 67, 68, 70

[56] References Cited

U.S. PATENT DOCUMENTS

| | | | |
|---|---|---|---|
| 4,202,965 | 5/1980 | Shimizu et al. | 528/499 |
| 4,205,162 | 5/1980 | Herscovici | 528/499 |
| 4,323,519 | 4/1982 | Mori et al. | 528/499 |
| 4,360,662 | 11/1982 | Williams | 528/499 |

*Primary Examiner*—Lester L. Lee
*Attorney, Agent, or Firm*—Oblon, Fisher, Spivak, McClelland & Maier

[57] ABSTRACT

A process for producing aromatic polyester polycarbonate particles from a methylene chloride solution of an aromatic polyester polycarbonate comprises continuously supplying the methylene chloride solution of an aromatic polyester polycarbonate to a particle-forming tank, heating it while maintaining it in a suspended state in water to evaporate methylene chloride and to form aromatic polyester polycarbonate particles, subjecting at least a part of the resulting aqueous slurry withdrawn from the particle-forming tank and containing the aromatic polyester polycarbonate particles to wet pulverization treatment and recycling the treated slurry to the particle-forming tank.

14 Claims, 2 Drawing Figures

PROCESS FOR PRODUCING AROMATIC POLYESTER POLYCARBONATE PARTICLES

The present invention relates to a process for producing aromatic polyester polycarbonate particles. More particularly, it relates to a process for producing aromatic polyester polycarbonate particles having a high bulk density and a uniform particle size, from a methylene chloride solution of an aromatic polyester polycarbonate (hereinafter referred to simply as a polyester polycarbonate).

As a method for obtaining a solid polyester polycarbonate from a methylene chloride solution of the polyester polycarbonate, there has been proposed a process wherein the organic solvent is evaporated from the solution (Japanese Unexamined Patent Publication No. 25427/1980) or a process wherein the solution is mixed with a nonsolvent such as acetone thereby to precipitate the polyester polycarbonate (Japanese Unexamined Patent Publication No. 139423/1980).

The solid polyester polycarbonate thereby obtained is then dried. In order to facilitate this drying operation, it is desired that the solid has a proper porosity. Further, in order to facilitate a further processing such as pelletizing by melt extrusion, it is desired that the solid particles have a high bulk density and a uniform particle size.

However, the solid polyester polycarbonate obtained by simply evaporating the organic solvent from the above-mentioned methylene chloride solution of the polyester polycarbonate, is not porous. Further, in order to pulverize this solid polyester polycarbonate, a strong motive power is required and yet the polyester polycarbonate thereby obtained has a non-uniform particle size including fine particles.

On the other hand, the polyester polycarbonate obtained by mixing the above-mentioned methylene chloride solution of the polyester polycarbonate with a non-solvent for precipitation, is fine flakes having an extremely low bulk density.

The present inventors have conducted extentive researches with an aim to produce polyester polycarbonate particles having satisfactory characteristics and, as a result, have found that when methylene chloride is evaporated from the methylene chloride solution of the polyester polycarbonate by suspending the solution in a particle-forming tank in which an aqueous slurry subjected to wet pulverization treatment and containing polyester polycarbonate particles is circulated, it is possible to produce polyester polycarbonate particles having a bulk density of from 0.3 to 0.7 g/cm³, a proper porosity and a uniform particle size, constantly for a long period of time. The present invention has been accomplished based on this discovery.

Namely, it is an object of the present invention to produce polyester polycarbonate particles having satisfactory characteristics in an industrially advantageous manner.

This object has been attained by a process for producing aromatic polyester polycarbonate particles from a methylene solution of an aromatic polyester polycarbonate, which comprises continuously supplying the methylene chloride solution of an aromatic polyester polycarbonate to a particle-forming tank, heating it while maintaining it in a suspended state in water to evaporate methylene chloride and to form aromatic polyester polycarbonate particles, subjecting at least a part of the resulting aqeuous slurry withdrawn from the particle-forming tank and containing the aromatic polyester polycarbonate particles to wet pulverization treatment and recycling the treated slurry to the particle-forming tank.

Now, the present invention will be described in detail with reference to the preferred embodiments.

As the methylene chloride solution of a polyester polycarbonate used in the present invention, there may be mentioned a solution of a polyester polycarbonate obtained by reacting a dihydroxydiaryl compound, a terephthaloyl chloride and/or an isophthaloyl chloride and phosgene by interfacial polymerization in the presence of water, methylene chloride and an acid-binding agent or by solution polyermization in the presence of methylene chloride and an acid-binding agent and washing the reaction mixture thereby obtained with an aqueous washing solution to remove impurities, or a solution obtained by concentrating such a solution.

The polyester polycarbonate has a structural unit represented by the general formula

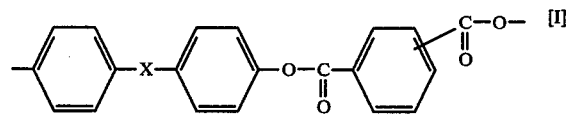

where X is a divalent group and the aromatic rings may have substituents, and a structural unit represented by the general formula

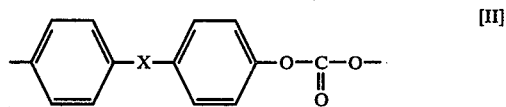

where X is a divalent group and the aromatic rings may have substituents. A preferred polyester polycarbonate has a molar ratio of dihydroxydiaryl compound residual groups:aromatic dibasic acid residual groups:carbonate bonds being 1:0.25–0.8:0.75–0.2 and [η] of from 0.3 to 1.2 as calculated by the equation $$\eta_{sp}/c = [\eta] + 0.427[\eta]^2 c$$

from $\eta_{sp}$ measured at 20° C. with use of a methylene chloride solution containing 0.6 g/dl of the polymer.

The dihydroxydiaryl compound as a starting material for the above-mentioned polyester polycarbonate is a compound represented by the general formula

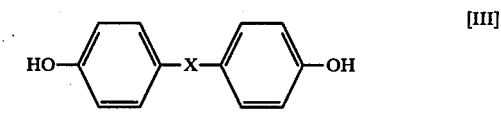

where X is a divalent group represented by

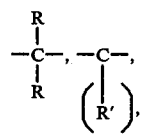

—O—, —S—, —SO— or —SO₂—, where R is a hydrogen atom or a monovalent hydrocarbon group and R' is a divalent hydrocarbon group, and the aromatic rings may be substituted by hydrogen atoms or monovalent hydrocarbon groups. Specifically, there may be mentioned bis(hydroxyaryl)alkanes such as bis(4-hydroxyphenyl)methane, 1,1-bis(4-hydroxyphenyl)ethane, 2,2-bis(4-hydroxyphenyl)propane, (bisphenol A), 2,2-bis(4-hydroxyphenyl)butane, 2,2-bis(4-hydroxyphenyl)octane, bis(4-hydroxyphenyl)phenyl methane, 2,2-bis(4-hydroxy-3-methylphenyl)propane, 1,1-bis(4-hydroxy-3-tert.-butylphenyl)propane, 2,2-bis(4-hydroxy-3-bromophenyl)propane, 2,2-bis(4-hydroxy-3,5-dibromophenyl)propane, 2,2-bis(4-hydroxy-3,5-dichlorophenyl)propane; bis(hydroxyaryl)cycloalkanes such as 1,1-bis(4-hydroxyphenyl)cyclopentane, or 1,1-bis(4-hydroxyphenyl)cyclohexane; dihydroxydiaryl ethers such as 4,4'-dihydroxydiphenyl ether or 4,4'-dihydroxy-3,3'-dimethyldiphenyl ether; dihydroxydiaryl sulfides such as 4,4'-dihydroxydiphenyl sulfide or 4,4'-dihydroxy-3,3'-dimethyldiphenyl sulfide; dihydoxydiaryl sulfoxides such as 4,4'-dihydoxydiphenyl sulfoxide or 4,4'-dihydroxy-3,3'-dimethyldiphenyl sulfoxide; or dihydroxydiaryl sulfones such as 4,4'-dihydroxydiphenyl sulfone or 4,4'-dihydroxy-3,3'-dimethyldiphenyl sulfone.

As the terephthaloyl chloride or the isophthaloyl chloride, there may be used those having halogen atoms such as chlorine or bromine or monovalent hydrocarbon groups such as methyl groups on their nuclei. For instance, methylterephthaloyl chloride, chloroterephthaloyl chloride, 2,5-dimethylterephthaloyl chloride, 2,5-dichloroterephthaloyl chloride, methyl isophthaloyl chloride or chloroisophtaloyl chloride may also be used.

As the acid-binding agent, there may be mentioned an alkali metal hydroxide such as sodium hydroxide or potassium hydroxide, or an organic alkali such as pyridine.

The methylene chloride used as a solvent for the polymerization reaction, may contain not more than 30% by weight of a chlorinated hydrocarbon such as chloroform, carbon tetrachloride, 1,2-dichloro ethane, 1,1,2-trichloroethane, tetrachloroethane, or chlorobenzene; an aromatic hydrocarbon such as toluene or xylene; an aliphatic hydrocarbon such as hexane or heptane; an alicyclic hydrocarbon such as cyclohexane; or a ketone such as acetone or methylethyl ketone. Such a solvent mixture does not adversely affect the process for the production of polyester polycarbonate particles according to the present invention. Accordingly, it is unnecessary to separate the methylene chloride from other solvents, and the reaction mixture obtained by the polymerization may be used as it is for the process of the present invention.

The concentration of the polyester polycarbonate in the methylene chloride solution is usually from 3 to 35% by weight, preferably from 5 to 25% by weight.

According to the present invention, the above-mentioned methylene chloride solution of the polyester polycarbonate is continuously supplied to a particle-forming tank in which an aqueous slurry treated by wet pulverization and containing polyester polycarbonate particles is circulated, and the evaporation of the methyl chloride is conducted while maintaining the solution in a suspended state.

Now, preferred embodiments of the present invention will be described with reference to the accompanying drawings.

Figure 2:
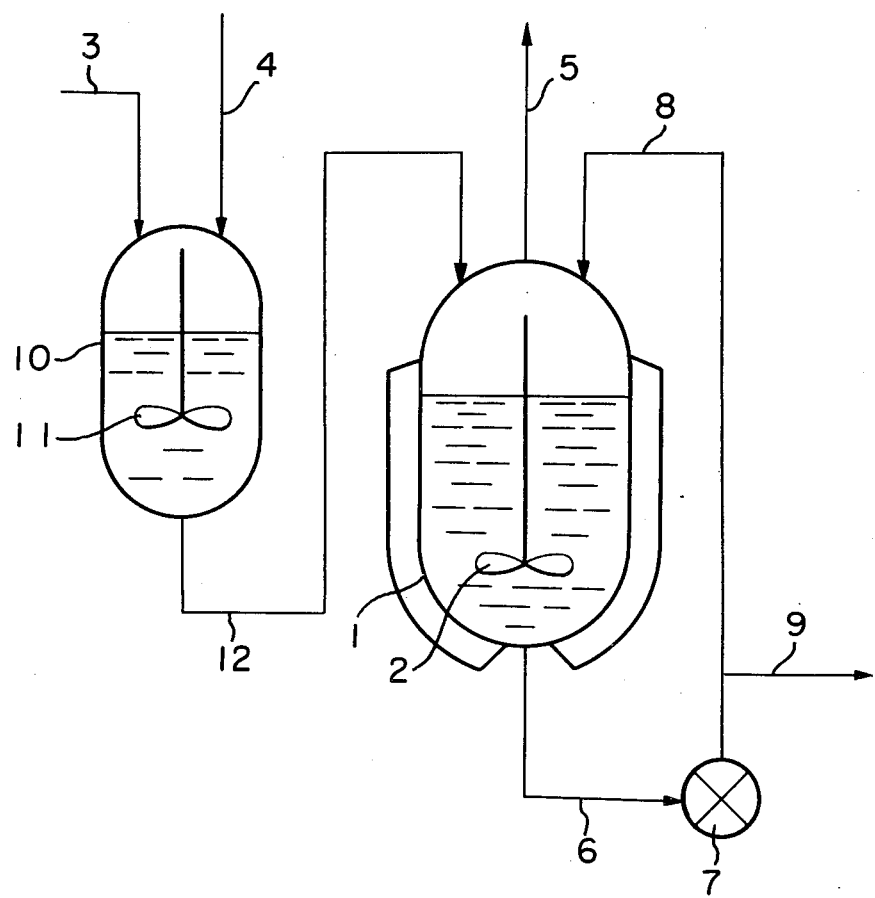

FIGS. 1 and 2 are diagrammatic views illustrating apparatus to be used for the operation of the process of the present invention.

Referring to FIGS. 1 and 2, reference numeral (1) designates a particle-forming tank, numeral (2) designates a stirrer, numeral (3) designates an inlet pipe for the polymer solution, numeral (4) designates an inlet pipe for the supplemental water, numeral (5) designates an outlet pipe for the evaporated methylene chloride, numeral (6) designates an outlet pipe for the aqueous slurry containing polymer particles, numeral (7) designates a wet pulverizer, numeral (8) designates an inlet pipe for the recycling aqueous slurry and numeral (9) designates a discharge pipe for the aqueous slurry containing product polymer particles. Further, in FIG. 2, reference numeral (10) designates a preconditioning tank, numeral (11) designates a stirrer and numeral (12) designates an outlet pipe for the oil-in-water type suspension mixture.

As the particle-forming tank (1), there may be used any apparatus which is provided with a stirring means capable of maintaining the methylene chloride solution of the polyester carbonate in a suspended state in water. A usual agitation tank is adequate for this purpose.

To this particle-forming tank (1), at least a part of the aqueous slurry containing polymer particles which has been withdrawn via the outlet pipe (6) and subjected to pulverization treatment by means of the wet pulverizer (7), is recycled via the inlet pipe (8) for the recycling aqueous slurry, and at the same time, supplemental water and methylene chloride solution of the polyester polycarbonate are continuously supplied via the supplemental water inlet tube (4) and the polymer solution inlet tube (3), respectively.

As illustrated in FIG. 1, the supplemental water is introduced into the particle-forming tank (1) via the supplemental water inlet pipe (4). However, the introduction of the supplemental water is not limited to this specific embodiment. For instance, the supplemental water may be introduced together with the above-mentioned recycling aqueous slurry or together with the methylene chloride solution of the polyester polycarbonate.

It is particularly preferred that as shown in FIG. 2, a separate preconditioning tank (10) is provided before the particle-forming tank (1), and the methylene chloride solution of the polyester polycarbonate and the supplemental water are introduced into this preconditioning tank (10) to form an oil-in-water type suspension mixture and the suspension mixture is then supplied via the outlet pipe (12) to the particle-forming tank (1), whereby stable operation can readily be made. The ratio of the methylene chloride solution to water to form the oil-in-water type suspension mixture varies depending upon the molar ratio of the components constituting the polyester polycarbonate, its molecular weight or its concentration in the methylene chloride solution. However, the volume ratio of the methylene chloride solution to water is preferably selected within a range of 1:0.1–4, more preferably 1:0.2–3.

Like the particle-forming tank (1), the preconditioning tank (10) may be of any type so long as it is capable of providing adequate stirring. A usual agitation tank is adequate for this purpose.

In this preconditioning tank (10), methylene chloride may be evaporated to such an extent that polyester polycarbonate particles do not form. Especially when polymer concentration in the methylene chloride solution of the polyester polycarbonate to be introduced in the preconditioning tank (10) is low, it is preferred to evaporate methylene chloride in the preconditioning tank (10) to raise the polymer concentration to a level of e.g. from 5 to 25% by weight so that polyester polycarbonate particles having a uniform particle size can be constantly formed in the particle-forming tank (1).

The temperature for the evaporation of the methylene chloride in the particle-forming tank (1) and the preconditioning tank (10) may be selected within a range of from the boiling point of the methylene chloride to the boiling point of water. However, it is unnecessary to evaporate water. Accordingly, the temperature is selected within a range of from 40° to 95° C., usually from 40° to 80° C. and preferably from 40° to 60° C.

Thus, as the methylene chloride is evaporated, there will be formed in the particle-forming tank (1) polyester polycarbonate particles as a combination of polyester polycarbonate powdery particles recycled after the wet pulverization treatment and the solid polyester polycarbonate formed from the supplied methylene chloride solution of polyester polycarbonate. The polyester polycarbonate particles thus formed are continuously withdrawn via the outlet pipe (6) in the form of an aqueous slurry.

In view of the efficiency of the stirring and the handling of the aqueous slurry, the amount of the polyester polycarbonate particles in the particle-forming tank (1) is advantageously within a range of from 5 to 30% by weight, preferably from 5 to 20% by weight, relative to the water in the particle-forming tank (1). The amount of the polyester polycarbonate particles is preferably maintained at a constant level within the above-mentioned range by adjusting the amount of the methylene chloride solution of the polyester polycarbonate supplied to the particle-forming tank (1), the amount of the supplemental water and the amount of the aqueous slurry containing the polyester polycarbonate particles withdrawn from the particle-forming tank.

In the present invention, at least a part of the aqueous slurry withdrawn via the outlet pipe (6) is treated by wet pulverization by means of a wet pulverizer (7) and then recycled to the particle-forming tank (1) and at the same time product polyester polycarbonate particles are obtained.

As the wet pulverizer (7) to be used for the wet pulverization treatment, any type may be employed so long as it is capable of pulverizing the solid in the slurry. However, preferred is a pulverizer which is not only capable of pulverizing the solid but also capable of transferring the aqueous slurry. For instance, the pulverizer is preferably of the type wherein stirring vanes rotate at a high speed or of the type wherein bladed stirring vanes rotate at a high speed. As a commercial pulverizer of the former type, there may be mentioned Pipe Line Homo Mixer (trademark) or Homo Mic Line Mill (trademark) manufactured by Tokushu Kika Kogyo K.K., and as a commercial pulverizer of the latter type, there may be mentioned Disintegrator (trademark) manufactured by Komatsu Zenoa K.K.

The pulverization by the wet pulverization treatment should be preferably conducted to such an extent that the polyester polycarbonate particles in the above-mentioned aqueous slurry become to have a particle size of from 0.1 to 4 mm, preferably from 0.2 to 2 mm.

The aqueous slurry thus treated by the wet pulverization treatment is recycled to the particle-forming tank (1) in an amount of from 10 to 99.5% by weight, preferably from 50 to 98% by weight, based on the total aqueous slurry withdrawn from the particle-forming tank (1). If the amount is too small, the particle size of the polyester polycarbonate particles formed in the particle-forming tank (1) gradually increases and tends to be non-uniform, thus leading to disadvantageous such that it becomes difficult to obtain satisfactory products or that continuous operation becomes to be impossible. On the other hand, if the amount is too much, the yield of the products becomes less although there is no adverse effect to the operation and the quality of the products.

In the illustrated embodiment, the aqueous slurry for obtaining polyester polycarbonate particles as a final product is withdrawn via the discharge pipe (9) from the aqueous slurry after the wet pulverization treatment. However, it may be withdrawn from the particle-forming tank (1) or from the outlet pipe (6). In order to obtain the polyester polycarbonate particles as the final product from the aqueous slurry, the particles are separated by a suitable mean such as decantation or filtration and then dried. However, if it is desired to further reduce the methylene chloride content in the polyester polycarbonate particles, the above-mentioned aqueous slurry may be introduced into a separate treating tank such as an agitation tank and treated at a temperature higher than the temperature of the particle-forming tank within a range of from 60° to 100° C., preferably from 75° to 98° C., and then particles may be separated and dried.

According to the process of the present invention, it is possible to produce polyester polycarbonate particles having a high bulk density and a uniform particle size in a simple operation constantly for a long period of time. Thus, the process is industrially extremely advantageous.

Now the present invention will be described in further detail with reference to Examples. However, it should be understood that the present invention is not restricted to these specific Examples. In the Examples, "%" means "% by weight".

EXAMPLE 1

With use of the apparatus as shown in FIG. 1, polyester polycarbonate particles having a molar ratio of bisphenol A residual groups:terephthalic acid residual groups:carbonate bonds being 1:0.53:0.47 and [$\eta$] of 0.56 were prepared.

As the particle-forming tank (1), a 20 l (an internal diameter of 26 cm) agitation tank provided with a jacket and equipped with a stirrer (2) having four turbine vanes having a vane length of 16 cm and vane width of 3 cm, was used.

As the recycling aqueous slurry, an aqueous slurry obtained by subjecting an aqueous slurry withdrawn from the aqueous slurry outlet pipe (6) and containing 8% of polyester polycarbonate particles to pulverization treatment by means of a wet pulverizer (7) (Pipe Line Homo Mixer (trademark) manufactured by Tokushu Kika Kogyo K.K.), was used and while recycling this aqueous slurry via the recycling aqueous slurry inlet pipe at a rate of 900 l/hr, 6 l/hr of the above-mentioned methylene chloride solution containing 8% of polyester polycarbonate was introduced via the polymer solution inlet pipe (3) and 10.4 l/hr of water was introduced via the supplemental water inlet pipe (4), and the evaporation of the methylene chloride was conducted at an internal temperature of 58° C. under stirring at a stirring vane rotational speed of 240 rpm to form polyester polycarbonate particles.

From the outlet side of the wet pulverizer (7), 11.3 l/hr of the aqueous slurry was withdrawn via the product aqueous slurry discharge pipe (9), and the contents of the particle-forming tank (1) was maintained to be 17 l.

The aqueous slurry thus withdrawn was filtrated to separate the polyester polycarbonate particles, and the particles were vacuum-dried at 140° C. for 3 hours.

The polyester polycarbonate particles thereby obtained had a bulk density of 0.32 g/cm$^3$ and a particle size of from 0.3 to 3 mm and contained no fine particles smaller than 0.3 mm.

EXAMPLE 2

With use of the apparatus as shown in FIG. 2, the production of particles of the same polyester polycarbonate as used in Example 1 was carried out.

As the particle-forming tank (1), the same apparatus as used in Example 1 was used. As the preconditioning tank (10), a 1.2 l agitation tank was used.

Into the preconditioning tank (10), 6 l/hr of a methylene chloride solution containing 8% of the above-mentioned polyester polycarbonate and 6 l/hr of water were continuously introduced via the polymer solution inlet pipe (3) and the supplemental water inlet pipe (4), respectively, and stirred to form an oil-in-water type suspension mixture, and this mixture was withdrawn via the outlet pipe (12) and supplied to the particle-forming tank (1).

Into the particle-forming tank (1), 5.3 l/hr of water was further introduced, and the rest of the operation was carried out in the same manner as in Example 1.

The polyester polycarbonate particles thereby obtained had a bulk density of 0.35 g/cm$^3$ and a particle size of from 0.3 to 2.4 mm and contained no fine powder.

EXAMPLE 3

With use of the same apparatus as used in Example 2, the operation was performed in the same manner as in Example 2 except that the methylene chloride solution containing 8% of the polyester polycarbonate and the supplemental water were introduced into the preconditioning tank (10) each at a rate of 10 l/hr, the supplemental water was introduced in the particle-forming tank (1) at a rate of 8.8 l/hr, the aqueous slurry was withdrawn from the outlet side of the wet pulverizer at a rate of 18.8 l/hr and the internal temperature of the particle-forming tank (1) was set to be 56° C.

The polyester polycarbonate particles thereby obtained had a bulk density of 0.38 g/cm$^3$ and a particle size of from 0.3 to 2.3 mm and contained no fine powder.

EXAMPLE 4

With use of an apparatus wherein an agitation tank provided with a jacket and having the same capacity and the same stirrer as the particle-forming tank (1) was provided as a methylene chloride removal tank after the discharge pipe (9) for the product aqueous slurry of the apparatus shown in FIG. 2, the production of the particles of the same polyester polycarbonate as used in Example 1 was carried out.

The operation of the preconditioning tank (10) and the particle-forming tank (1) was performed in the same manner as in Example 2, and the water slurry withdrawn from the discharge pipe for the product aqueous slurry was introduced into the methylene chloride removal tank. The aqueous slurry in the tank was maintained at a temperature of 85° C. to evaporate methylene chloride. From the methylene chloride removal tank, the aqueous slurry was withdrawn so that the aqueous slurry in the tank is maintained at a level of 17 l, and polyester polycarbonate particles were separated by filtration and vacuum-dried at 140° C. for 3 hours.

The polyester polycarbonate particles thereby obtained had a bulk desnity of 0.38 g/cm$^3$ and a particle size of from 0.3 to 2.3 mm and contained no fine powder.

EXAMPLE 5

The production of polyester polycarbonate particles was carried out with use of the same apparatus as used in Example 4 except that as the preconditioning tank (10), a 1.2 l agitation tank provided with a jacket and equipped with a discharge pipe for evaporated methylene chloride was used.

Into the preconditioning tank (10), 12 l/hr of a methylene chloride solution containing 4% of the same polyester polycarbonate as used in Example 1 and 6 l/hr of supplemental water were introduced and stirred to form an oil-in-water type suspension mixture, and the internal temperature was maintained at 41° C. to distill off 6 l/hr of methylene chlorode from the methylene chloride discharge pipe.

From the mixture outlet pipe (12) of the preconditioning tank (10), 12 l/hr of the oil-in-water type suspension mixture was withdrawn and supplied to the particle-forming tank (1).

To the particle-forming tank (1), 900 l/hr of an aqueous slurry withdrawn from the particle-forming tank and subjected to pulverization treatment and containing polyester polycarbonate particles was recycled and at the same time, 5.3 l/hr of supplemental water was introduced. The subsequent operation was performed in the same manner as in Example 4.

The polyester polycarbonate particles thereby obtained had a bulk density of 0.40 g/cm$^3$ and a particle size of from 0.3 to 2.0 mm, and contained no fine powder.

COMPARATIVE EXAMPLE 1

With use of the same particle-forming tank (1) as used in Example 1, the production of particles of the same polyester polycarbonate as used in Example 1 was carried out without recycling the aqueous slurry.

Into the particle-forming tank (1), 4 l/hr of a methylene chloride solution containing 8% of the above-mentioned polyester polycarbonate and 8 l/hr of water were continuously supplied and while maintaining the internal temperature at 58° C., methylene chloride was evaporated to form polyester polycarbonate particles.

From the bottom of the particle-forming tank, 11.3 l/hr of the aqueous slurry containing the polyester polycarbonate particles was withdrawn to maintain the aqueous slurry in the particle-forming tank at a level of 17 l.

Polyester polycarbonate particles obtained by filtration and drying, from the aqueous slurry obtained after 1 hour from the initiation of the operation, were grown or aggregated particles having a non-uniform particle size of from 1.5 to 6.5 mm. Thereafter, it became difficult to constantly withdraw the aqueous slurry through the pipe, and no further operation became possible.

COMPARATIVE EXAMPLE 2

The production of particles of the same polyester polycarbonate as used in Example 1 was carried out in the same manner as in Example 1 except that instead of the wet pulverizer (7) in the apparatus shown in FIG. 1, a diaphragm pump (Aired Pump (trademark) YD-20 Model manufactured by Iwaki K.K.) was used and the aqueous slurry withdrawn from the aqueous slurry outlet pipe (6) was recycled without the wet pulverization treatment.

Polyester polycarbonate particles obtained by filtration and drying, from the product aqueous slurry obtained after 30 minutes from the initiation of the operation, were grown or aggregated particles having a non-uniform particle size of from 1.5 to 5 mm. Thereafter, the particles accumulated at the valve portion of the diagraph pump and closed the valve portion, and no further operation became possible.

We claim:

1. A process for producing aromatic polyester polycarbonate particles from a methylene chloride solution of an aromatic polyester polycarbonate, which comprises continuously supplying the methylene chloride solution of an aromatic polyester polycarbonate and water to a particle-forming tank wherein water is present in an amount sufficient to form a methylene chloride-in-water suspension, heating the suspension to evaporate methylene chloride and to form aromatic polyester polycarbonate particles, subjecting at least part of the resulting aqueous slurry withdrawn from the particle-forming tank and containing the aromatic polyester polycarbonate particles to pulverization treatment and returning the pulverized aqueous slurry to the particle-forming tank.

2. The process according to claim 1 wherein the particle-forming tank is maintained at a temperature of from 40° to 95° C.

3. The process according to claim 1 wherein the concentration of the aromatic polyester polycarbonate in the methylene chloride solution is from 3 to 35% by weight.

4. The process according to claim 1 wherein the concentration of the aromatic polyester polycarbonate in the aqueous slurry in the particle-forming tank is from 5 to 30% by weight relative to the water.

5. The process according to claim 1 wherein the amount of the aqueous slurry recycled to the particle-forming tank is from 10 to 99.5% by weight of the total aqueous slurry withdrawn from the particle-forming tank.

6. A process for producing aromatic polyester polycarbonate particles from a methylene chloride solution of an aromatic polyester polycarbonate, which comprises continuously mixing the methylene chloride solution of an aromatic polyester polycarbonate and water wherein water is present in an amount sufficient to form a methylene chloride-in-water suspension, continuously supplying the mixture to a particle-forming tank, heating the said suspension to evaporate methylene chloride and to form aromatic polyester polycarbonate particles, subjecting at least part of the resulting aqueous slurry withdrawn from the particle-forming tank and containing the aromatic polyester polycarbonate particles to pulverization treatment and returning the pulverized aqueous slurry to the particle-forming tank.

7. The process according to claim 6 wherein the volume ratio of the methylene chloride solution of an aromatic polyester polycarbonate to water in the mixture of an oil-in-water type suspension is 1:0.1-4.

8. The process according to claim 6 wherein the methylene chloride solution of an aromatic polyester polycarbonate and water are mixed in an agitation tank.

9. The process according to claim 6 wherein the particle-forming tank is maintained at a temperature of from 40° to 95° C.

10. The process according to claim 6 wherein the concentration of the aromatic polyester polycarbonate in the methylene chloride solution is from 3 to 35% by weight.

11. The process according to claim 6 wherein the concentration of the aromatic polyester polycarbonate in the aqueous slurry in the particle-forming tank is from 5 to 30% by weight relative to the water.

12. The process according to claim 6 wherein the amount of the aqueous slurry recycled to the particle-forming tank is from 10 to 99.5% by weight of the total aqueous slurry withdrawn from the particle-forming tank.

13. The process according to claim 1 wherein the pulverization treatment of the aqueous slurry containing the aromatic polyester polycarbonate particles is conducted to such an extent that the said particles have a particle size of about 0.1 to 4 mm.

14. The process according to claim 1 wherein the pulverization treatment of the aqueous slurry containing the aromatic polyester polycarbonate particles is conducted to such an extent that the said particles have a particle size of about 0.2 to 2 mm.

* * * * *